United States Patent
Gong

(10) Patent No.: US 9,405,334 B2
(45) Date of Patent: Aug. 2, 2016

(54) ELECTRONIC CARD HOLDER AND ELECTRONIC DEVICE USING SAME

(71) Applicant: ShenZhen Goldsun Network Intelligence Technology Co., Ltd., Shenzhen (CN)

(72) Inventor: Hai-Tao Gong, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 0 days.

(21) Appl. No.: 14/594,764

(22) Filed: Jan. 12, 2015

(65) Prior Publication Data

US 2016/0098067 A1 Apr. 7, 2016

(30) Foreign Application Priority Data

Oct. 7, 2014 (CN) .......................... 2014 1 0519193

(51) Int. Cl.
| | | |
|---|---|---|
| *G06F 1/16* | (2006.01) | |
| *H05K 5/00* | (2006.01) | |
| *H05K 7/00* | (2006.01) | |
| *G06F 1/18* | (2006.01) | |

(52) U.S. Cl.
CPC .............. *G06F 1/183* (2013.01); *G06F 1/181* (2013.01)

(58) Field of Classification Search
CPC ............ G06F 1/18; G06F 1/181; G06F 1/183
USPC ............ 361/679.33, 679.34, 679.35, 679.36, 361/679.37, 679.38, 679.39, 724, 725, 726, 361/727; 312/223.1, 223.2, 223.3
See application file for complete search history.

(56) References Cited

U.S. PATENT DOCUMENTS

| | | | | |
|---|---|---|---|---|
| 8,432,682 B2* | 4/2013 | Quan | ................. | G06K 13/0825 361/679.38 |
| 8,534,777 B2* | 9/2013 | Gong | ..................... | G06F 1/187 312/223.2 |
| 8,605,451 B2* | 12/2013 | Tang | .................... | H04B 1/3816 361/679.31 |
| 8,634,208 B2* | 1/2014 | Duan | ................... | G06K 13/085 361/679.38 |
| 8,947,885 B2* | 2/2015 | Wu | ....................... | G06F 1/1613 361/679.31 |
| 8,976,521 B2* | 3/2015 | Liu | ...................... | G06K 7/0021 361/679.38 |
| 9,077,109 B1* | 7/2015 | Lin | ..................... | G06K 13/0812 |
| 9,268,357 B2* | 2/2016 | Kyle | ......................... | G06F 1/16 |
| 2009/0267677 A1* | 10/2009 | Myers | .................... | G06K 13/08 327/356 |
| 2011/0194263 A1* | 8/2011 | Shen | .................. | G06K 13/0837 361/754 |
| 2012/0162925 A1* | 6/2012 | Luo | ..................... | G06K 13/0831 361/727 |
| 2012/0195013 A1* | 8/2012 | Trzaskos | ............ | G06K 13/0831 361/754 |
| 2013/0070415 A1* | 3/2013 | Terry | ................... | G11B 33/124 361/679.38 |

* cited by examiner

*Primary Examiner* — Anthony Haughton
(74) *Attorney, Agent, or Firm* — ScienBiziP, P.C.

(57) ABSTRACT

An electronic card holder includes a fixed member, a tray slidably attached to the fixed member and defines a notch thereon, and a latching member. The latching member includes a main body fixed to the fixed member, a pressing portion extending from the main body and a latching portion extending from the main body towards the fixed member. When the latching portion is received in the notch, the tray is engaged with the fixed member. When the latching portion is driven to move away the notch by an external pressure applied on the pressing portion, the tray is disengaged from the fixed member.

15 Claims, 4 Drawing Sheets

ELECTRONIC CARD HOLDER AND ELECTRONIC DEVICE USING SAME

FIELD

The subject matter herein generally relates to an electronic card holder and an electronic device using same.

BACKGROUND

Electronic card holder can be attached to an electronic device, so that the electronic device can accommodate an electronic card such as Subscriber Identity Model card (SIM card), Secure Digital Memory card (SD card) or like and communicate with other electronic devices, store information or like.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
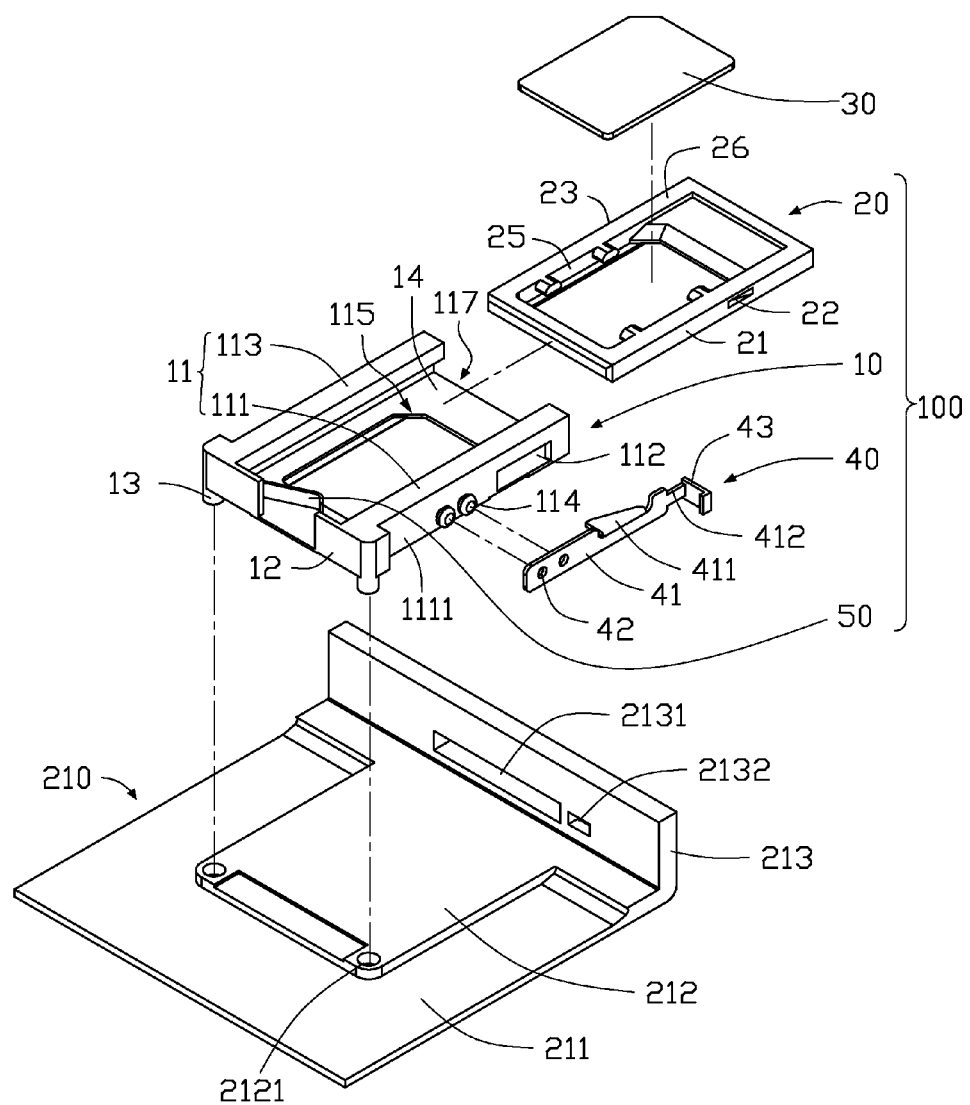
FIG. 1 is a partial exploded isometric view of an embodiment of the electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
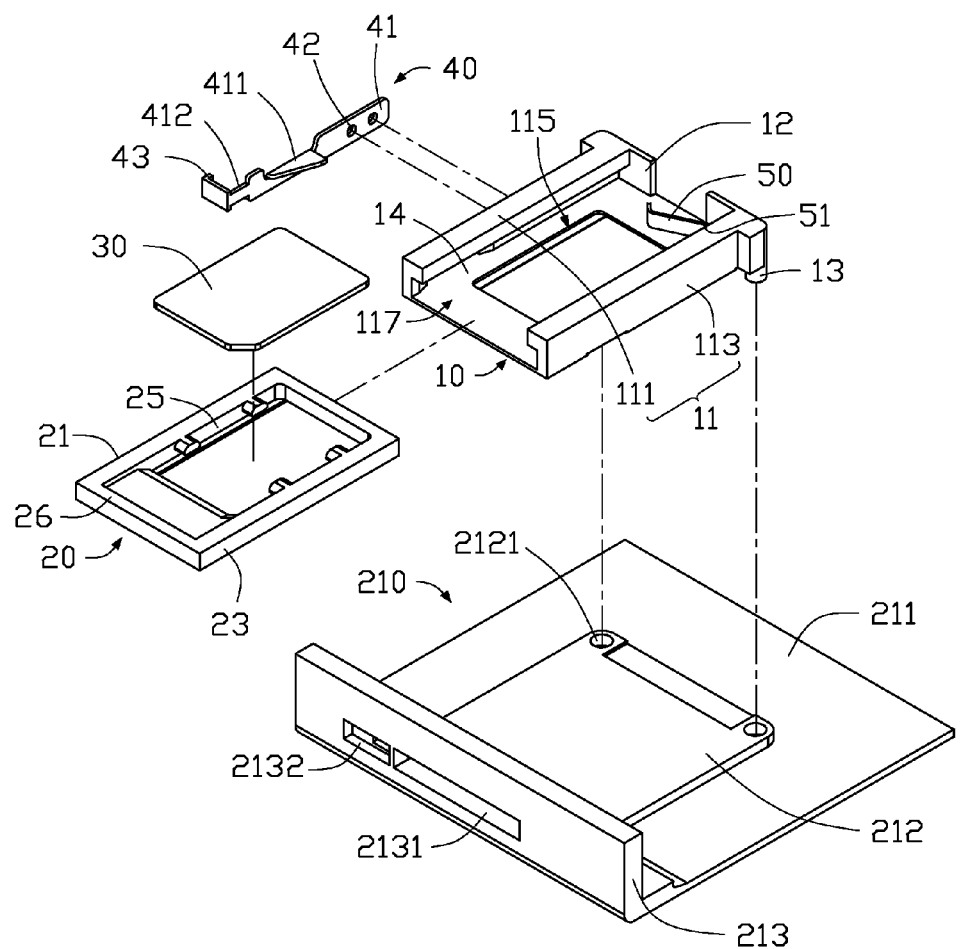
FIG. 2 is similar as FIG. 1, but viewed from another angle.

FIGS. 1 and 2 show an electronic device 200. The electronic device 200 can be a mobile phone, or a computer including, but not limited to, a portable computer, or a tablet computer, or a desktop computer, or like. The electronic device 200 can include a housing 210 and an electronic card holder 100. The electronic device 200 can also include other functional modules to fulfill different functions; however, it is not shown and specifically described for simplification.

The housing 210 can include a bottom plate 211, a supporting portion 212 protruded from the bottom plate 211, and a peripheral sidewall 213 protruded from an edge of the bottom plate 211 and substantially perpendicular to the bottom plate 211.

The supporting portion 212 can be substantially laminal. One end of the supporting portion 212 close to the peripheral sidewall 213 can resist the peripheral sidewall 213, and the other end of the supporting portion 212 away from the peripheral sidewall 213 can define two holes 2121. In this embodiment, the two holes 2121 can be used to fix the electronic card holder 100 to the supporting portion 212. In at least one embodiment, the number of the two holes 2121 can be but not limited to two, furthermore, the two holes 2121 can be replaced by at least one protrusion.

The peripheral sidewall 213 can define a housing opening 2131 and a slide groove 2132. The housing opening 2131 can be substantially strip-type. The slide groove 2132 can be close to the housing opening 2131. In at least one embodiment, the housing opening 2131 and the slide groove 2132 can be interconnected with each other The electronic card holder 100 can include a fixed member 10, a tray 20 and a latching member 40.

The fixed member 10 can be attachable to the housing 210. In detail, the fixed member 10 can be attached to the supporting portion 212 and further resist the peripheral sidewall 213. The fixed member 10 can be rectangular-shaped and drawer-shaped. The fixed member 10 can include two sidewalls 11, two end walls 12, two posts 13 and a supporting plate 14.

The two sidewalls 11 can include a first side wall 111 and a second side wall 113. The first side wall 111 can be protruded from one side of the supporting plate 14. The second side wall 113 can be protruded from other side of the supporting plate 14. The first side wall 111 can be parallel to and opposite the second side wall 113. The first side wall 111 and the second side wall 113 can cooperatively form a defined receiving space 115. The receiving space 115 has an opening 117 which is close to the peripheral sidewall 213. In this embodiment, the defined receiving space 115 is further formed by the first side wall 111, the second side wall 113, the two end walls 12 and the supporting plate 14.

The two end walls 12 can be protruded from one end of the supporting plate 14 away from the peripheral sidewall 213. Each end wall 12 can be substantially perpendicular to the first side wall 111 and the second side wall 113. One end wall 12 can be coupled to one end of the first side wall 111 away from the peripheral sidewall 213 and the other end wall 12 can be coupled to one end of the second side wall 113 away from the peripheral sidewall 213.

Each post 13 can be protruded from one of the two end walls 12 and further face the supporting portion 12. Each post 13 can receive in one of the two holes 2121 to fix the fixed member 10 to the supporting portion 12.

In this embodiment, the two end walls 12 can be separate and face with each other. The number of the posts 13 can be two. In at least one embodiment, the two end walls 12 can be coupled with each other, and the number of the posts 13 can be but not limited two. Furthermore, the two posts 13 can be replaced by at least one hole so as to receive the at least one protrusion protruded from the supporting portion 212.

The fixed member 10 can define a sidewall opening 112 on the first side wall 111 and can include two mounting posts 114 protruded from a sidewall 1111 of the first side wall 111 opposite the defined receiving space 115. The sidewall opening 112 can be located close to the peripheral sidewall 213. The two mounting posts 114 can be located close to one side of the sidewall opening 112 away from the peripheral sidewall 213. In this embodiment, the extension direction of the sidewall opening 112 can be but not limited to parallel to a sliding direction of the tray 20. The two mounting posts 114 can be separate with each other, and a wired line of the two mounting posts 113 can be parallel to an extension direction of the sidewall opening 112. In this embodiment, the number of the mounting posts 114 can be two. In at least one embodiment, the number of the mounting post 114 can be but not limited two.

The tray 20 can be slidably attached to the fixed member 10. In detail, the tray 20 can be received in the defined receiving space 115. The tray 20 can further slide in the defined receiving space 115 along a direction perpendicular to the peripheral sidewall 213. The tray 20 has a first side outer surface 21 parallel to the first side wall 111 and a second side outer surface 23 parallel to the second side wall 113. The tray 20 can define a sidewall notch 22 on the first side outer surface 21. In this embodiment, the sidewall notch 22 can be pyramid shaped, and the shape of the sidewall notch 22 along a plane parallel with the sliding plane of the tray 20 can be triangle-shaped. The tray 20 can further define a defined space 25 on an upper surface 26 of tray 20 away from the supporting plate 14 for accommodating an electronic card 30. In at least one embodiment, the electronic card 30 can be Subscriber Identity Model card (SIM card), Secure Digital Memory card (SD card) or other suitable electronic card.

The latching member 40 can include a strip shaped main body 41 and an L-shaped pressing portion 43 extending from the main body 41 away from the first side wall 111 and further bending toward the main body 42. The latching member 40 can define two mounting holes 42 on the main body 41. Each mounting post 113 can receive in one of the two mounting holes 42 to engage the latching member 40 with the fixed member 10. In detail, one end of the main body 41 can be fixed to the fixed member 10 by each mounting post 113 receiving in one of the two mounting holes 42 and the other end of the main body 41 can be coupled to the L-shaped pressing portion 43. One end of the pressing portion 43 coupled to the main body 41 can be perpendicular to main body 41, and the other end of the pressing portion 43 away from the main body 41 can be substantially parallel to the main body 41.

The latching member 40 can be elastic. In this embodiment, the latching member 40 can be steel stamping molded. In at least one embodiment, the latching member 40 can be made of plastic.

The latching member 40 can further include a latching portion 411 protruding from the main body 41 toward the defined receiving space 115. The latching portion 411 can be triangle-shaped. The latching portion 411 can pass through the sidewall opening 112 and further receive in the sidewall notch 22 to engage the tray 20 with the fixed member 10.

In this embodiment, the two mounting holes 42 can be corresponding to the two mounting posts 114. Each mounting post 114 can be received in one of the two mounting holes 42 to engage the latching member 40 with the fixed member 10. In at least one embodiment, the latching member 40 can be fixed to the fixed member 10 by glue, screws or other suitable ways.

The latching member 40 can define a latch groove 412 on the main body 41. The latch groove 412 can resist the peripheral sidewall 213 thus to latch the latching member 40 to the peripheral sidewall 213.

Figure 3:
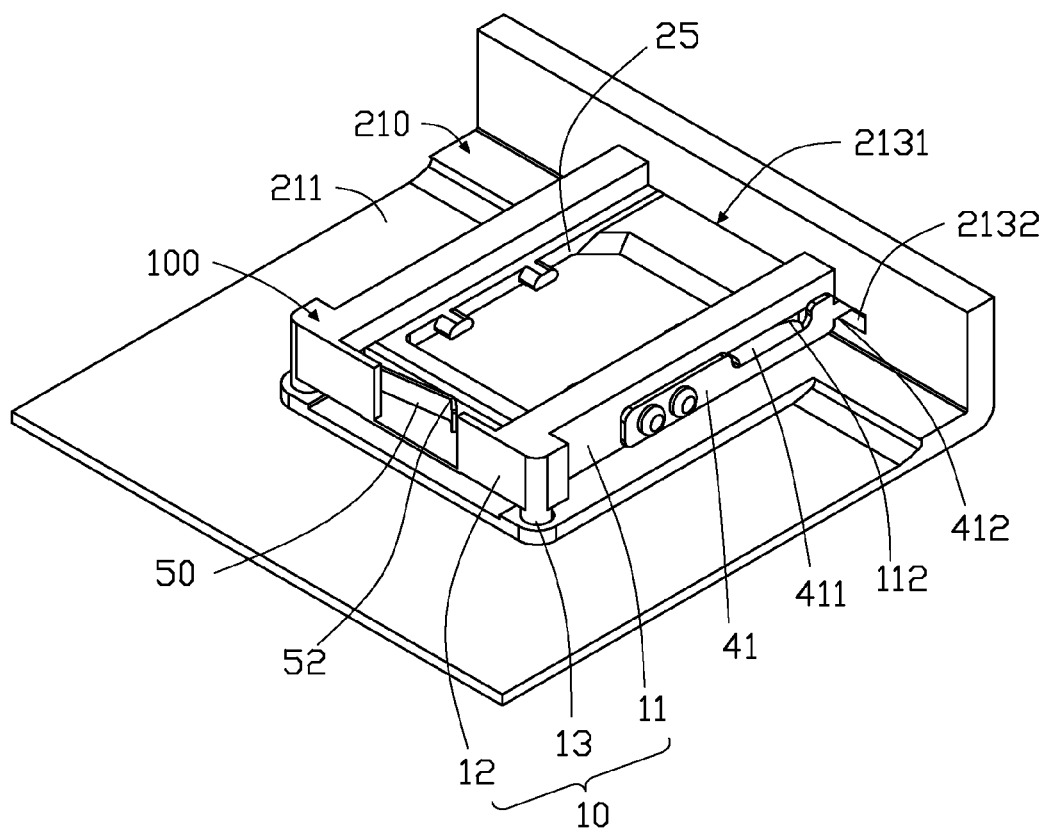
FIG. 3 is a diagrammatic view of the electronic device shown in FIG. 1 in a first state.
Figure 4:
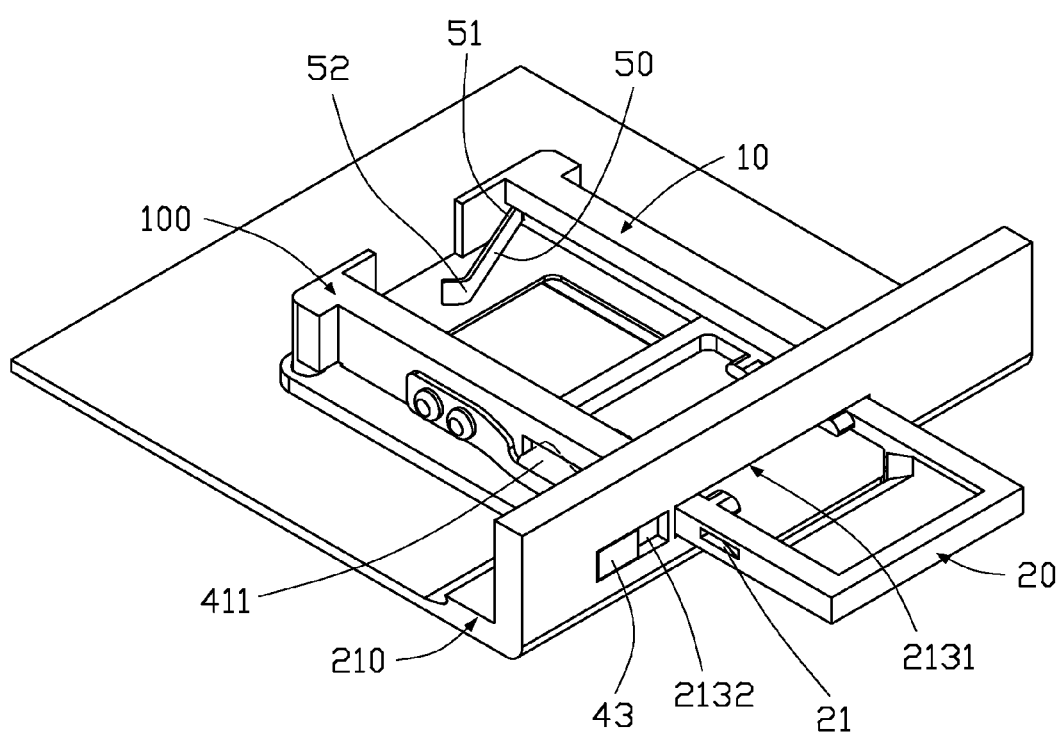
FIG. 4 is a diagrammatic view of the electronic device shown in FIG. 1 in a second state.

Referring to FIGS. 1, 3 and 4, the electronic card holder 100 can further include an elastic member 50. The elastic member 50 can include a fixed end 51 fixed to one of the two sidewalls 11 and a resisting end 52 coupled to the fixed end 51. The resisting end 52 can be a free end and slantwise extend towards the tray 20 and further resist one end of the tray 20 away from the peripheral sidewall 213.

In this embodiment, the elastic member 50 can be strip shaped. In at least one embodiment, the elastic member 50 can be a spring or other suitable elastic member, furthermore, the elastic member 50 can be fixed to the end wall 12.

Referring to FIGS. 1-4, when in assembly, the fixed member 10 can be fixed to the supporting portion 212 by each post 13 receiving in one of the two holes 212. The elastic member 50 can be fixed to the second side wall 113 of the fixed member 10. The latching member 40 can be fixed to the first sidewall 111 of the fixed member 10. The tray 20 can pass through the housing opening 2131 and the housing 117 in sequence, and receive in the defined receiving space 115, and further resist the elastic member 50, the elastic member 50 can be thus compressed. The latching portion 411 can pass through the sidewall opening 112, and receive in the sidewall notch 22 thus to engage the tray 20 with the fixed member 10. The pressing portion 43 can protrude from the slide groove 2132 for a user pressing.

If one wants to take out the electronic card 30 from the tray 20, an external pressure can be applied to the pressing portion 43, thereby causing the pressing portion 43 to slide in the slide groove 2132 towards a direction away from the sidewall notch 22 thus to disengage the latching portion 411 from the sidewall notch 22. An elastic restoring force of the elastic member 50 can thus drive the tray 20 to move out the housing opening 2131 of the housing 210. Furthermore, an elastic restoring force of the latching member 40 can drive itself to return its initial position.

If one wants to insert the tray 20 into the fixed member 10, an external pressure can be applied to the pressing portion 43, thereby causing the pressing portion 43 to slide in the slide groove 2132 towards a direction away from the sidewall notch 22 to allow the tray 20 passing through the housing opening 2131 and inserting into the fixed member 10. An elastic restoring force of the elastic member 50 can drive itself to return its initial position, and the latching portion 411 can receive in the sidewall notch 22 to engage the tray 20 with the fixed member 10.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic card holder comprising:
   a fixed member attachable to an electronic device, the fixed member having a first side wall and a second side wall substantially parallel to and opposite the first side wall, the first side wall and the second side wall forming a defined receiving space, and the defined receiving space having an opening;
   a tray configured to accommodate an electronic card usable with the electronic device, the tray slidably receivable in the defined receiving space through the opening, the tray having a first side outer surface parallel to the first side wall and a second side outer surface parallel to the second side wall; and a latching member attached to a sidewall of the first side wall opposite the defined receiving space, the latching member having a main body, a pressing portion extending from the main body away from the first side wall and a latching portion protruding from the main body toward the defined receiving space;

wherein, the sidewall defines a sidewall opening through which the latching portion may extend, and the tray defines a sidewall notch on the first side outer surface for receiving the latching portion;

wherein, when the tray is engaged with the fixed member, the latching portion passes through the sidewall opening and is received in the sidewall notch; and wherein, the latching portion is driven to move away from the sidewall notch by an external pressure applied on the pressing portion of the latching member, the tray is thus disengaged with the fixed member.

2. The electronic card holder of claim 1, wherein the fixed member further comprises a supporting plate connecting the first side wall with the second side wall, and two end walls protruded from the supporting plate, one end wall connects the first side wall and the other end wall connects the second side wall, the defined receiving space is further formed by the supporting plate and the two end walls.

3. The electronic card holder of claim 1, wherein the electronic card holder further comprises an elastic member fixed to the two end walls and resisting the tray, when the tray is engaged with the fixed member, the elastic member is in a compressed state, and when the tray is disengaged with the fixed member, the tray is driven to move out from the opening by the elastic member.

4. The electronic card holder of claim 3, wherein the elastic member comprises a fixed end fixed to the two end walls and a resisting end slantwise extending towards the tray and resisting the tray.

5. The electronic card holder of claim 1, wherein the electronic card holder further comprises an elastic member fixed to the second side wall and resisting the tray, when the tray is engaged with the fixed member, the elastic member is in a compressed state, and when the tray is disengaged with the fixed member, the tray is driven to move out from the opening by the elastic member.

6. The electronic card holder of claim 5, wherein the elastic member comprises a fixed end fixed to the second side wall and a resisting end slantwise extending towards the tray and resisting the tray.

7. The electronic card holder of claim 1, wherein the main body defines at least one mounting hole, the first side wall comprises at least one mounting post protruded therefrom, and each mounting post receives in one of the at least one mounting hole, thus to fix the latching member to the fixed member.

8. An electronic device, comprising:

a housing comprising a bottom plate and a peripheral sidewall protruded from the bottom plate, and the peripheral sidewall defining a housing opening and a slide groove; and an electronic card holder comprising:

a fixed member attachable to the bottom plate, the fixed member having a first side wall and a second side wall substantially parallel to and opposite the first side wall, the first side wall and the second side wall forming a defined receiving space, the defined receiving space having an opening;

a tray configured to accommodate an electronic card usable with the electronic device, the tray slidably passing through the housing opening and the opening in sequence and further receiving in the defined receiving space, the tray having a first side outer surface parallel to the first side wall and a second side outer surface parallel to the second side wall; and a latching member attached to a sidewall of the first side wall opposite the receiving space, the latching member having a main body, a pressing portion extending from the main body away from the first side wall and further protruding out from the slide groove, and a latching portion protruding from the main body toward the defined receiving space;

wherein, the sidewall defines a sidewall opening through which the latching portion may extend, and the tray defines a sidewall notch on the first side outer surface for receiving the latching portion;

wherein, when the tray is engaged with the fixed member, the latching portion passes through the sidewall opening and is received in the sidewall notch; and wherein, the latching portion is driven to move away from the sidewall notch by an external pressure applied on the pressing portion of the latching member, the tray is thus disengaged with the fixed member.

9. The electronic device of claim 8, wherein the latching member define a latch groove on the main body, the latch groove resists the peripheral sidewall thus to latch the latching member to the peripheral sidewall.

10. The electronic device of claim 8, wherein the fixed member further comprises a supporting plate connecting the first side wall with the second side wall, and two end walls protruded from the supporting plate, one end wall connects the first side wall and the other end wall connects the second side wall, the defined receiving space is further formed by the supporting plate and the two end walls.

11. The electronic device of claim 10, wherein the electronic card holder further comprises an elastic member fixed to the two end walls and resisting the tray, when the tray is engaged with the fixed member, the elastic member is in a compressed state, and when the tray is disengaged with the fixed member, the tray is driven to move out from the opening by the elastic member.

12. The electronic device of claim 11, wherein the elastic member comprises a fixed end fixed to the two end walls and a resisting end slantwise extending towards the tray and resisting the tray.

13. The electronic device of claim 8, wherein the electronic card holder further comprises an elastic member fixed to the second side wall and resisting the tray, when the tray is engaged with the fixed member, the elastic member is in a compressed state, and when the tray is disengaged with the fixed member, the tray is driven to move out from the opening by the elastic member.

14. The electronic device of claim 13, wherein the elastic member comprises a fixed end fixed to the second side wall and a resisting end slantwise extending towards the tray and resisting the tray.

15. The electronic device of claim 8, wherein the main body defines at least one mounting hole, the first side wall comprises at least one mounting post protruded therefrom, each mounting post receives in one of the at least one mounting hole, thus to fix the latching member to the fixed member.

* * * * *